March 16, 1937.  L. E. HOLLAND  2,074,222
APPARATUS FOR ETCHING PLATES
Filed Nov. 18, 1935  2 Sheets-Sheet 1

INVENTOR
Louis E. Holland.
BY
ATTORNEY

March 16, 1937.  L. E. HOLLAND  2,074,222
APPARATUS FOR ETCHING PLATES
Filed Nov. 18, 1935   2 Sheets-Sheet 2
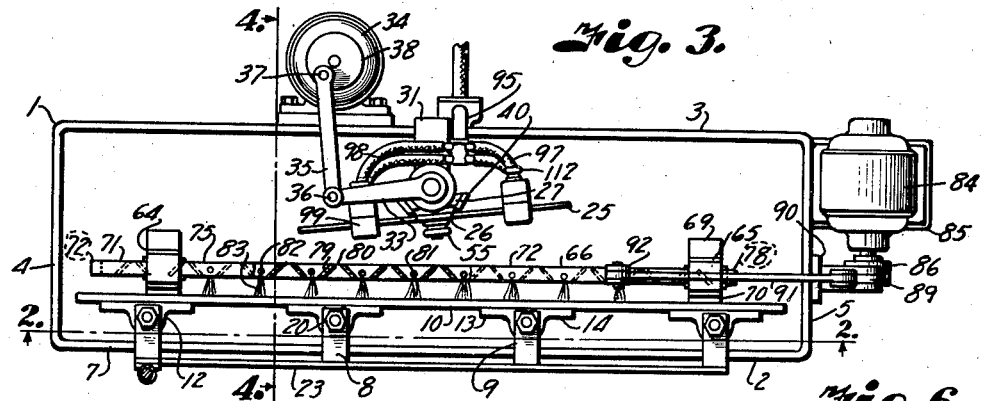
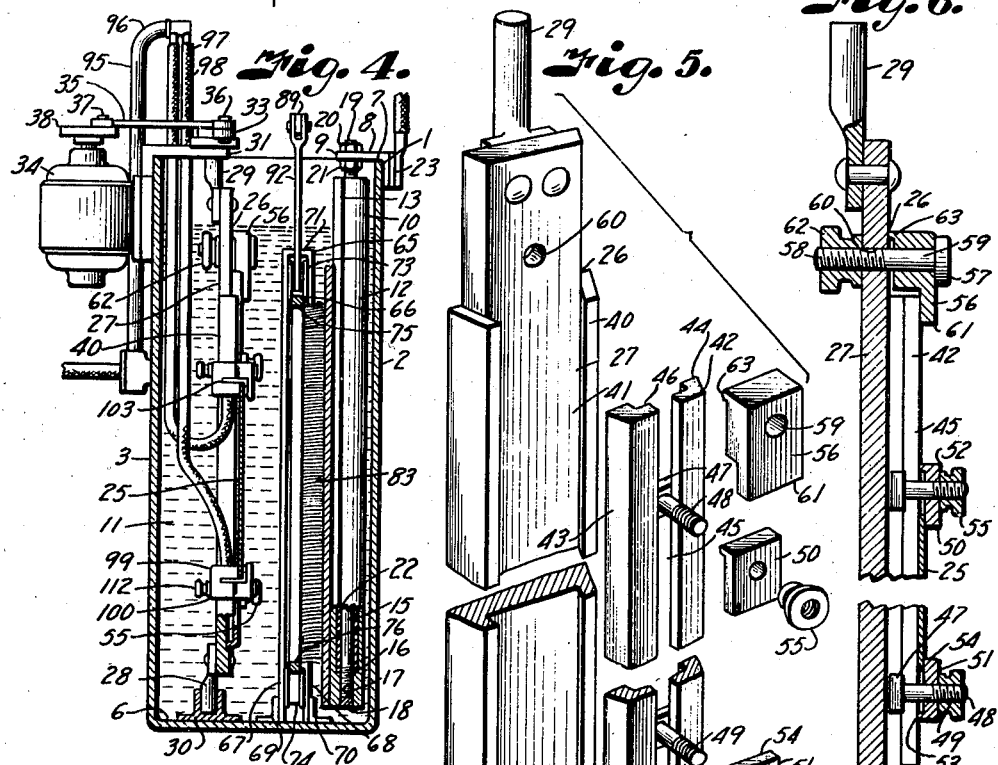
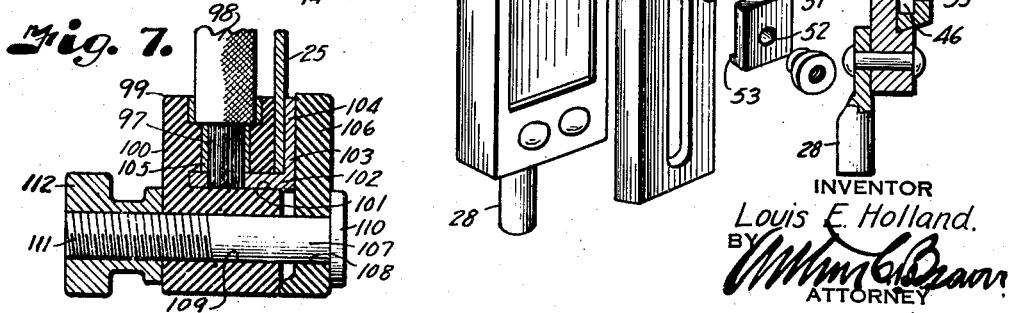
INVENTOR
Louis E. Holland.
BY
ATTORNEY Patented Mar. 16, 1937

2,074,222

UNITED STATES PATENT OFFICE 2,074,222

APPARATUS FOR ETCHING PLATES

Louis E. Holland, Kansas City, Mo.

Application November 18, 1935, Serial No. 50,341

9 Claims. (Cl. 204—5)

This invention relates to an apparatus for electrically etching plates and the like. In electrical etching, as heretofore practiced, it has been customary to immerse a plate to be etched in a bath of electrolyte, and to pass a current through the plate and bath to a cathode, also immersed in the electrolyte, so that the portions of the plate exposed to the electrolyte will dissociate from the plate to produce the etching, the plate, in some instances, being reciprocated in the bath to wash the particles of the metal that have been dissociated from the exposed portions of the plate by electro-mechanical action thereby speeding up the etching operation and producing more regular lines.

I have discovered that by agitating the electrolyte relatively to the plate, particularly with a jetting action, washing of the dissociated particles from the plate, and removing of such particles from the region of the plate, is facilitated, and by reason of such constant exposure of the surface to be etched to clean electrolyte, the time of etching is greatly reduced and the quality of the finished product is greatly improved. I have also found that by rocking the plate reversely to flow of the electrolyte, more direct contact of the electrolyte with the surface to be etched is effected, thereby producing a clearer plate with sharper lines. This treatment of the plate also produces faster etching in the high lights and holds more contrast in the finished product.

It is, therefore, the principal object of the present invention to provide improved apparatus for agitating the electrolyte and effecting rocking movement of the plate relatively to the flow of the electrolyte while the plate is supported in vertical position.

Other important objects of the invention are to provide the agitating apparatus with means for keeping the cathode free and clear of particles dissociated from the plate, and to provide improved means for supporting the plate for vertical rocking movement in the electrolyte relatively to a vertically positioned cathode.

In accomplishing these and other objects of the invention, as hereinafter pointed out, I have provided improved details of structure, the preferred form of which is illustrated in the accompanying drawings wherein:

Fig. 3 is a plan view of the apparatus.

Fig. 4 is a cross section on the line 4—4 of Fig. 3.

Fig. 5 is a detail perspective view of the parts of the plate rocker and plate support shown in disassembled spaced relation to better illustrate their construction.

Fig. 6 is an enlarged vertical section through the plate rocker.

Fig. 7 is a detail section through one of the plate terminal clamps.

Figure 1:
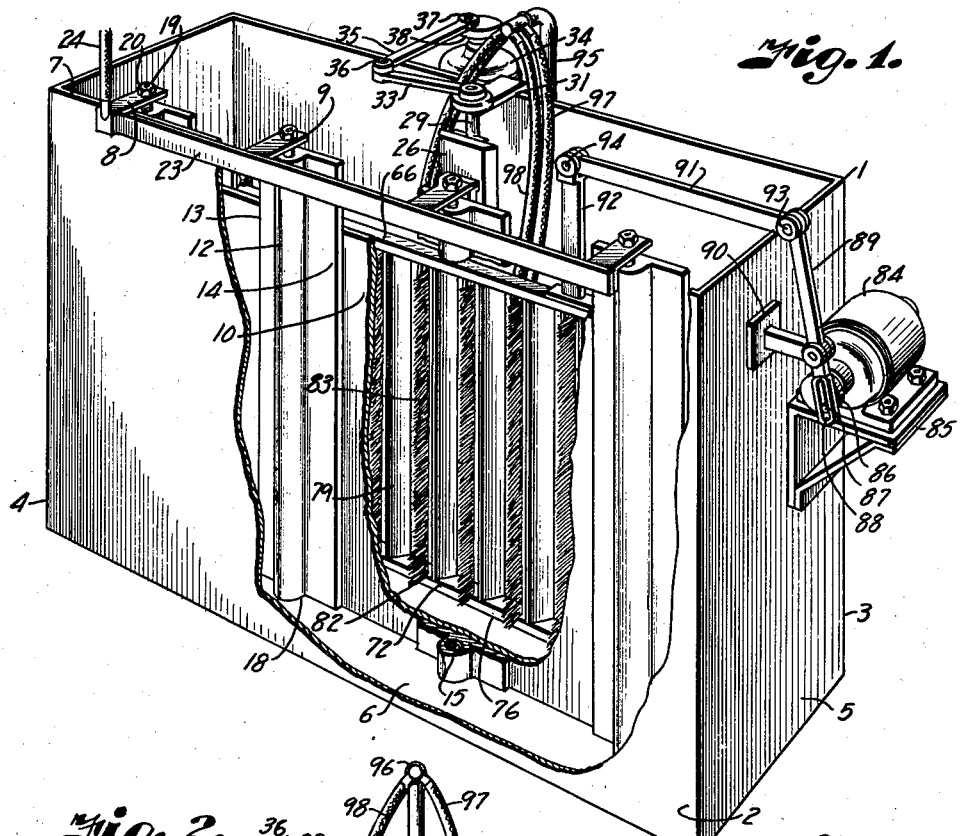
Fig. 1 is a perspective view of an etching apparatus embodying the features of the present invention.

Referring more in detail to the drawings:

1 designates a tank consisting of side and end walls 2—3 and 4—5 and a bottom 6 preferably formed of metal, but completely protected on both inner and outer faces from the attack of an electrolyte solution, contained therein, by a coating of non-corrosive material, such as porcelain.

Fixed at spaced points along the upper edge of the side wall 2 are angle-shaped brackets 8, having arms 9 projecting inwardly over the top of the tank, to suspend a cathode plate 10 in submergence in the body of electrolyte 11 that is contained within the tank. The cathode plate preferably conforms in shape to the side wall of the tank, but is of smaller dimensions so that the end and lower edges thereof are spaced from the end and bottom walls 4, 5 and 6. Fixed to the rear side of the cathode plate, in alignment with each of the arms 9, is a substantially tubular shaped supporting member 12, having laterally extending flanges 13 and 14 fixed to the cathode in any suitable manner. The members 12 are of sufficient length that they suspend the plate below the level of the electrolyte when the upper ends thereof are in slightly spaced relation with the arms 9.

Extending through the tubular supports are electrical conductors 15, comprising rods having their lower ends 16 threaded into sockets 17, formed in the lower closed ends 18 of the supports, while their opposite ends 19 are extended through suitable openings in the arms 9 wherein they are adjustably retained by nuts 20 and 21 threaded thereon and engaging the respective sides of the arms. The conductors 15 are of smaller diameter than the inner diameter of the supports to accommodate insulating linings 22 therein for insulating the conductors from the support except for the lower ends thereof that are mounted in the sockets 17, as best shown in Fig. 4.

The angle shaped brackets are connected by a common bus bar 23, which in turn is connected with one of the terminal leads 24 of a circuit for supplying a suitable etching current to the plate, as later described.

A plate 25 to be etched is carried in lateral spaced relation from the cathode on a rocker 26 that is trunnioned at the opposite side of the tank, as now to be described. The rocker 26 includes a vertical bar-like plate 27, having trunnions 28 and 29 fixed to and projecting from the ends thereof for respective mounting in a socket bearing 30 that is fixed to the bottom of the tank midway the length thereof, and in an angle shaped arm 31 that is mounted on the upper edge of the side wall 2, as best shown in Fig. 4. The upper trunnion 29 is of sufficient length to extend through the arm 31 to mount an oscillatory lever arm 33 thereon, which is actuated by a motor 34 through a connecting rod 35, one end of the rod being connected to the arm 33 by a pin 36, and its opposite end to a pin 37 carried by an eccentric disk 38 fixed to the driving shaft of a motor unit 34, as best shown in Figs. 3 and 4.

The rocker bar 27 is provided with longitudinal side flanges 40 fixed thereto at converging angles relatively to the face of the bar to form a substantially dove-tail guideway 41, in which is mounted a plate carrying slide 42. The slide 42 comprises a bar having inclined side edges 43 and 44, conforming in shape to the angle of the flanges 40, so that the slide is guidingly retained thereby.

Formed in the slide 42 is a longitudinal slot 45, opening downwardly from the upper end thereof to a point adjacent its bottom end, as best shown in Fig. 5. Extending longitudinally of the slot, at the rear face of the slide, is a recess 46 for accommodating the heads 47 of plate fastening devices 48. The fastening devices 48 include threaded shanks 49 projecting through the slot to mount plate engaging clamps 50 and 51. The clamps 50 and 51 include plate-like clips, having openings 52 therein, for passing the shanks 49, and having ribs 53 extending along one side thereof to engage against the face of the slide when the opposite jaw portion 54 engages over the edges of the plate, as shown in Fig. 6.

The clips are retained in engagement with the plate, and the plate against the slide, by nuts 55 that are threaded on the shanks 49 to engage against the outer faces of the clips. It is thus apparent that when the nuts 55 are threaded onto the shanks of the fastening devices, the heads thereof are drawn into the recess 46, and the clips are caused to fulcrum on their flanges 53 so that the ends 54 thereof grippingly engage the upper and lower edges of the plates, as shown in Fig. 6.

The fastening devices thus described are adjustably mounted in the slot of the guide to accommodate plates of different width that may be mounted upon the slide. The slide 42 is retained on the rocker bar by means of a lug 56 that is retained by a bolt 57, having a shank 58 extending through an opening 59 in the lug, and through an opening 60 in the upper end of the rocker bar, as shown in Figs. 5 and 6. The lug 56 has a depending jaw portion 61 which is drawn into gripping engagement with the upper end of the slide by a nut 62 threaded on the shank 58. The lug 56 has a rib 63, similar to the rib portion of the clips previously described, to enhance the gripping action of the jaw 61 against the upper end of the slide.

Mounted in the ends of the tank at points adjacent the ends of the cathode plate, are vertical post-like brackets 64 and 65, for mounting an agitator frame 66 to effect jetting action of the electrolyte against the plate during the etching process, as later described. The brackets 64 and 65 each include spaced vertical bars 67 and 68, fixed to the bottom of the tank by angle clips 69 and 70, the upper ends of the bars being retained in parallel relation by connecting bars 71 to form ways therethrough for the agitator frame 72. Rotatably mounted within the ways at the upper and lower ends of the brackets, are double flanged rollers 73 and 74 to engage the upper and lower rails 75 and 76 of the agitator frame 72.

The frame 72 also includes end members 77 and 78 connecting the ends of the rails 75 and 76 to retain them in vertically spaced relation for mounting agitating plates 79, arranged in pairs with the members of each pair converging in the direction of the plate, but spaced apart to provide elongated jet openings 80 through which the electrolyte is caused to flow incidental to reciprocation of the agitator frame. The opposite edges of the plate of adjacent pairs are likewise spaced to form bottom openings 81, wherethrough the electrolyte is directed in washing contact with the face of the cathode plate to retain it free of material removed from the plate 25. The jets issuing from the opening 80, as well as those issuing from the openings 81, are directed in an angular direction depending upon the movement of the agitator, so that they exert a swishing action against the plate and cathode, thereby enhancing the effect of the jets.

Also extending across the frame, between the rails 75 and 76, are rods 82, carrying brushes 83 adapted to sweep across the surface of the cathode to cooperate with the jetting action of the electrolyte in removing the dissociated material that may tend to lodge thereon. The brushes 83 are spaced relatively to the degree of reciprocation of the agitator so that one brush sweeps in overlapping extent to its adjacent brushes. Thus the entire area of the cathode face is kept clean and free of etched material.

Figure 2:
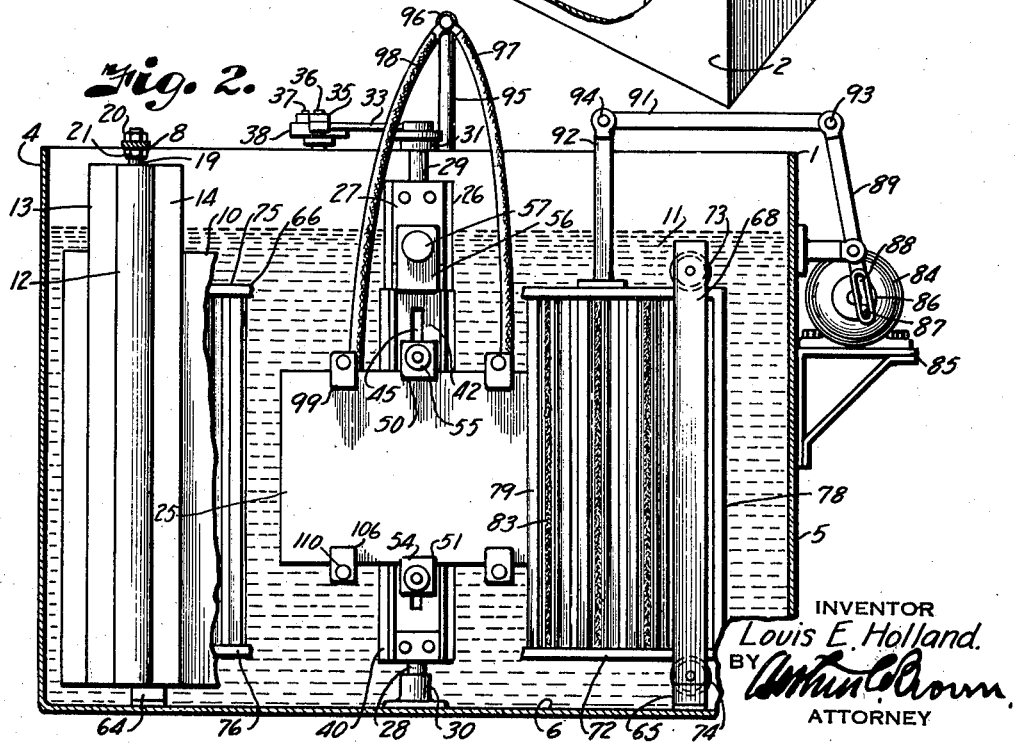
Fig. 2 is a longitudinal section through the apparatus on the line 2—2 of Fig. 3, parts of the cathode and electrolyte agitator being broken away to better illustrate the mounting of the plate and the plate rocker.

The agitator thus described is operated by means of a motor unit 84, supported on a bracket 85, that is attached to the end wall 5 of the tank, as best shown in Figs. 1 and 2. Fixed on the output shaft of the motor unit is a disk 86, carrying an eccentrically positioned pin 87 that is operable in a slot 88 of a rock lever 89. The rock lever 89 is pivotally mounted on a bracket arm 90 also fixed to the end wall 5 of the tank.

The upper end of the rocker arm projects above the tank and connects by a link 91 with an arm 92, extending upwardly from the agitator frame, the link being connected to the lever 89 and the arm 92 by pins 93 and 94 respectively.

In order to supply current to the plate, the side wall 2 of the tank carries a conductor 95, having a curved end 96 to which is connected a plurality of flexible conductors 97 that are covered by a suitable sheathing 98, that is not affected by the action of the electrolyte. Fixed to the free end of each of the flexible conductors is a terminal clamp 99. Each clamp 99 includes a block 100, preferably formed of insulating material, for example a phenolic resin known as "Bakelite", and has a notch 101 in which is mounted one leg 102 of a metallic angle shaped contactor 103, so arranged that its other arm 104 engages the edge of the plate 25. The conductor 97 extends into a socket 105 in the block, and has its end connected in electric contact with the arm 102. The sheathing 98, as well as the metallic portion of the conductor, is sealed within the socket to exclude the electrolyte from the metallic core of the conductor.

Cooperating with the arm 103 of the contactor is a clamping jaw 106 that is adjustably mounted on the block 99 by a bolt 107, extending through an opening 108 in the jaw and through an aligning opening 109 in the block. The head 110 of the bolt preferably engages against the outer face of the jaw, and the shank 111 projects from the opposite side of the block to mount a nut 112 by which pressure is exerted on the jaw to enhance the electrical contact of the arm 104 with the edge of the plate.

In using an apparatus constructed and assembled as described, the clamping lug 56 is removed and the slide 42 is withdrawn from the rocker bar 26. The plate to be etched is then attached to the slide bar, with the slide bar engaging the vertical medium line thereof. This is accomplished by adjusting the fastening devices 48, so that the jaw portions 54 clampingly overlap the upper and lower edges of the plate, to urge the plate against the front surface of the slide. A suitable number of terminal plate clamps 99 are then secured to the edges of the plate to properly distribute the current thereto, the terminals being slipped over the edges of the plates so that the contact portions 103 engage the face of the plate, after which the bolts 107 are tightened to draw the jaw 106 into clamping engagement for enhancing the electrical contact between the plate and terminal.

After application of the plate, the slide is then reinserted in the guide of the rocker bar, and secured by reinserting the lug 56 and bolt 57, so that the jaw portion 61 thereof clampingly engages the upper end of the slide, as shown in Fig. 6. The motor units are then started to effect vertical rocking movement of the plate and agitation of the electrolyte. During rocking of the plate the angles of inclination thereof are varied relatively to the jets of electrolyte that are directed thereagainst incidental to reciprocation of the agitator.

While the machine is operating, the electrolyte acting on the exposed surfaces of the plate, decomposes such exposed surfaces and as the agitator is reciprocated back and forth, the electrolyte issuing from said jets is washed against the plate to flush the decomposed material from the exposed surfaces, thereby removing such material from the etching area, so that constantly fresh electrolyte is being applied to the plate without interference from the removed particles. Reciprocation of the agitator also causes similar jets to be directed against the surface of the cathode plate to cooperate with the brushes in keeping the plate free of dissociated material removed from the plate, during passage of electric current from the plate and across the electrolyte to the cathode plate.

After the etching process has been completed, movement of the rocker is suspended by shutting down the motor unit 34. The clamp 56 is again removed, and the slide carrying the plate is withdrawn from the rocker bar, after which the plate is removed from the slide, and the machine is ready for the application of a new plate to be etched.

I have found that by agitating the electrolyte, as above described, together with rocking movement of the plate, a much more rapid and cleaner etching is effected than by movement of the plate alone, and that the color and other quality factors are enhanced by simultaneous jetting action of the solution and tilting the plate since a more positive and direct application of electrolyte is provided.

What I claim and desire to secure by Letters Patent is:

1. In an apparatus of the character described, means for supporting a plate to be etched in vertical position in a body of electrolyte, means for passing an electrical current through the plate and electrolyte to effect dissociation of particles from the plate, a plurality of blades mounted for reciprocation in parallel relation with a side of the plate being etched, means for reciprocating said blades for directing the electrolyte against the plate and washing dissociated particles from the plate, and means for oscillating the plate to different angular positions relative to said blades.

2. In an apparatus of the character described, means for supporting a plate to be etched in vertical position in a body of electrolyte, means for passing an electrical current through the plate and electrolyte to effect dissociation of particles from the plate, a frame, means for supporting the frame for horizontal reciprocation in a vertical plane, a series of paired agitator blades carried by the frame and adapted to direct currents of electrolyte alternately in different directions against the plate in response to reciprocation of the blades, and an actuator for reciprocating the frame to direct flushing currents of electrolyte against said plate.

3. In an apparatus of the character described, means for supporting a plate to be etched in vertical position in a body of electrolyte, means for passing an electrical current through the plate and electrolyte to effect dissociation of particles from the plate, a frame, means for supporting the frame for reciprocation in a vertical plane, a series of paired agitator blades carried by the frame, an actuator for reciprocating the frame to induce flushing currents of electrolyte against said plate, and means for oscillating the plate.

4. In an apparatus of the character described, a tank for containing an electrolyte solution, a plate support mounted in the tank for oscillation on a vertical axis, a plate holder slidably mounted on the plate support, means for oscillating said support, a cathode in the tank, means for passing an electrical etching current to the plate and from the plate through the electrolyte solution to the cathode, and an agitator mounted for reciprocation in a vertical plane between the plate and cathode for inducing a flushing current of electrolyte against the plate to wash particles from the plate.

5. In an apparatus of the character described, a tank for containing an electrolyte solution, a plate support mounted in the tank for oscillation on a vertical axis, a plate holder slidably mounted on the plate support, means for oscillating said support, a cathode in the tank, means for passing an electrical etching current to the plate through the electrolyte solution to the cathode, an agitator mounted for reciprocation in a vertical plane between the plate and cathode for inducing a flushing current of electrolyte against the plate to wash particles from the plate, including means for inducing similar currents against said cathode, and means for reciprocating the agitator.

6. In an apparatus of the character described, a tank for containing an electrolyte solution, a plate support mounted in the tank for oscillation on a vertical axis, a plate holder slidably mounted on the plate support, means for oscillating said support, a cathode in the tank, means for passing an electrical etching current to the plate and from the plate through the electrolyte solution to the cathode, an agitator mounted for reciprocation in a vertical plane between the plate and cathode for inducing a flushing current of electrolyte against the plate to wash particles from the plate, brushes on the agitator for sweepingly contacting the cathode, and means for reciprocating the agitator.

7. In an apparatus of the character described, a tank for containing an electrolyte solution, a plate support mounted in the tank for oscillation on a vertical axis, a plate holder slidably mounted on the plate support, means for oscillating said support, a cathode in the tank, means for passing an electrical etching current to the plate and from the plate through the electrolyte solution to the cathode, an agitator mounted for reciprocation in a vertical plane between the plate and cathode for inducing a flushing current of electrolyte against the plate to wash particles from the plate, including means for inducing similar currents against said cathode, brushes on the agitator for sweepingly contacting the cathode, and means for reciprocating the agitator.

8. In an apparatus of the character described, a tank for containing an electrolyte solution, a plate support mounted in the tank for oscillation on a vertical axis, a plate holder slidably mounted on the plate support, means for oscillating said support, a cathode in the tank, means for passing an electrical etching current to the plate and from the plate through the electrolyte solution to the cathode, an agitator, spaced supports in the tank, rollers on the supports for guidingly retaining the agitator for reciprocatory movement relatively to the plate, and means for reciprocating the agitator to induce currents of electrolyte in washing contact with the plate.

9. In an apparatus of the character described, a tank for containing an electrolyte solution, a plate holder for mounting a plate to be etched in vertical position in the electrolyte solution, a vertically arranged cathode plate in the tank, an agitator, means supporting the agitator for reciprocation between the plate holder and cathode plate, means for reciprocating the agitator, and brushes mounted in spaced relation on the agitator and sweepingly engaging the cathode plate, the spacing between said brushes being less than the reciprocatory movement of the agitator so that the sweeping extent of one brush overlaps that of an adjacent brush.

LOUIS E. HOLLAND.